March 6, 1934. P. BUSHKOVSKI 1,949,779
HEADING MACHINE FOR KAFFIR-CORN, SORGHUM, AND THE LIKE
Filed Nov. 19, 1931 3 Sheets-Sheet 2
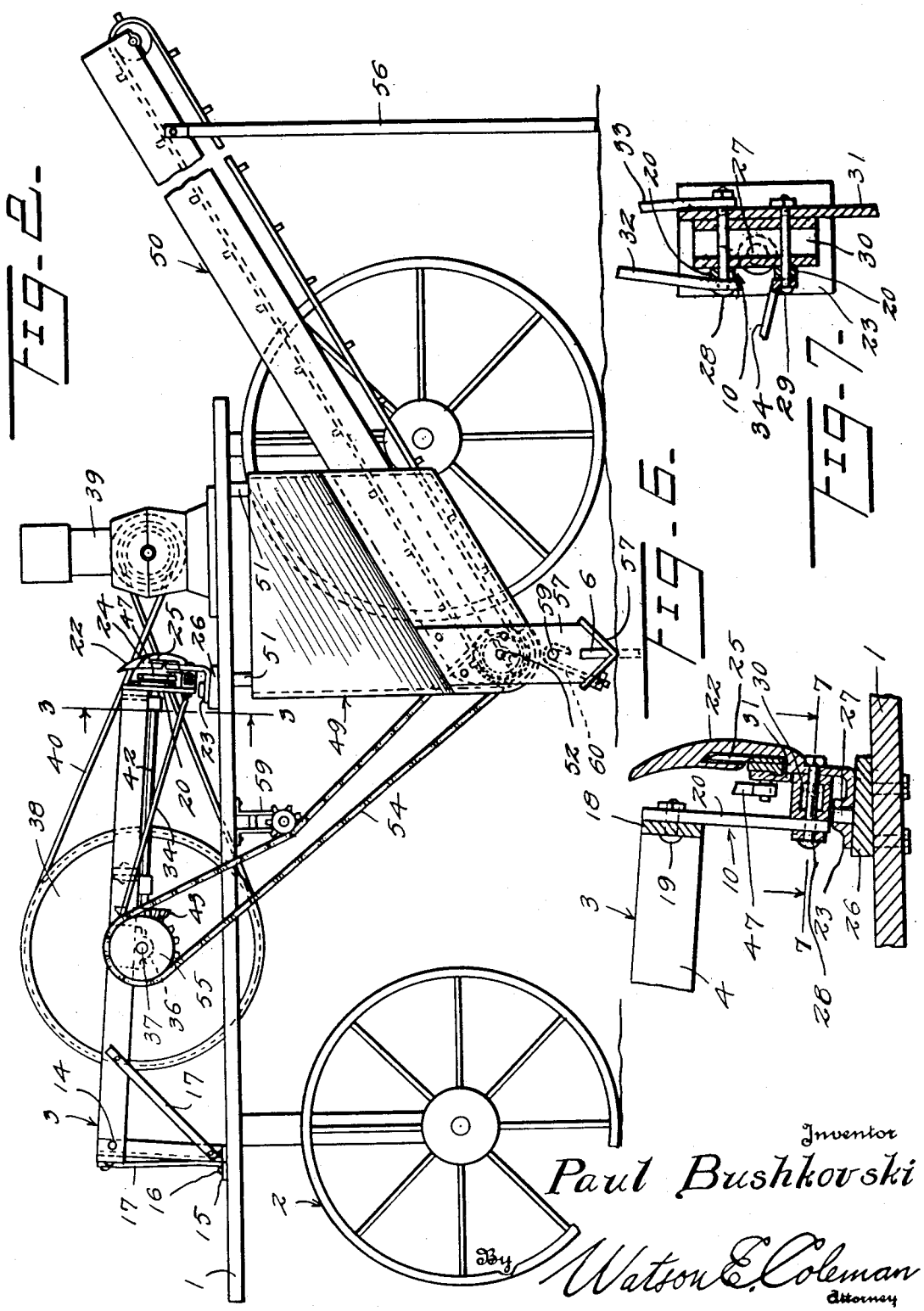
Inventor
Paul Bushkovski
By Watson E. Coleman
Attorney March 6, 1934.　　　P. BUSHKOVSKI　　　1,949,779
HEADING MACHINE FOR KAFFIR-CORN, SORGHUM, AND THE LIKE
Filed Nov. 19, 1931　　　3 Sheets-Sheet 3
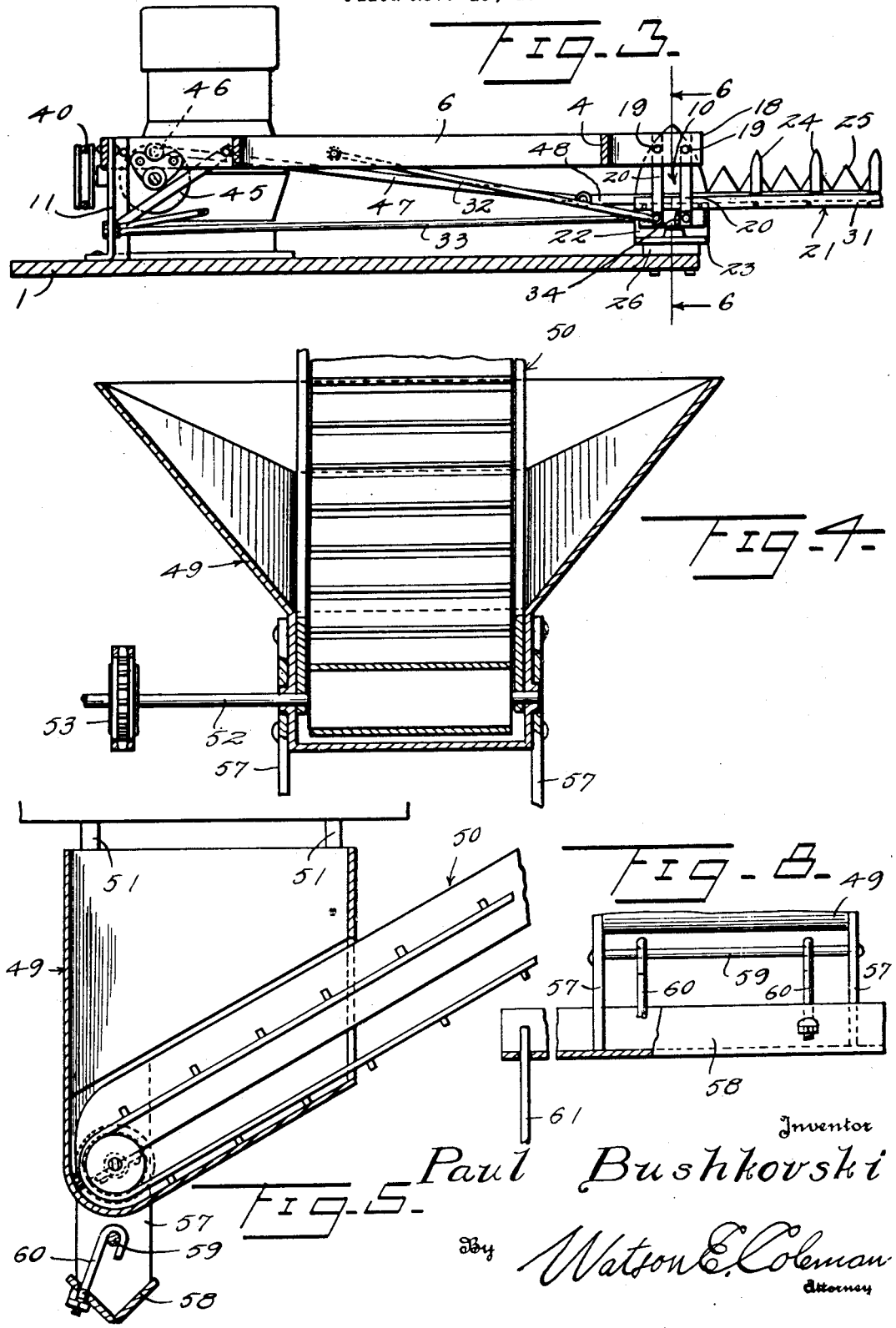
Inventor
Paul Bushkovski
By Watson E. Coleman
Attorney Patented Mar. 6, 1934

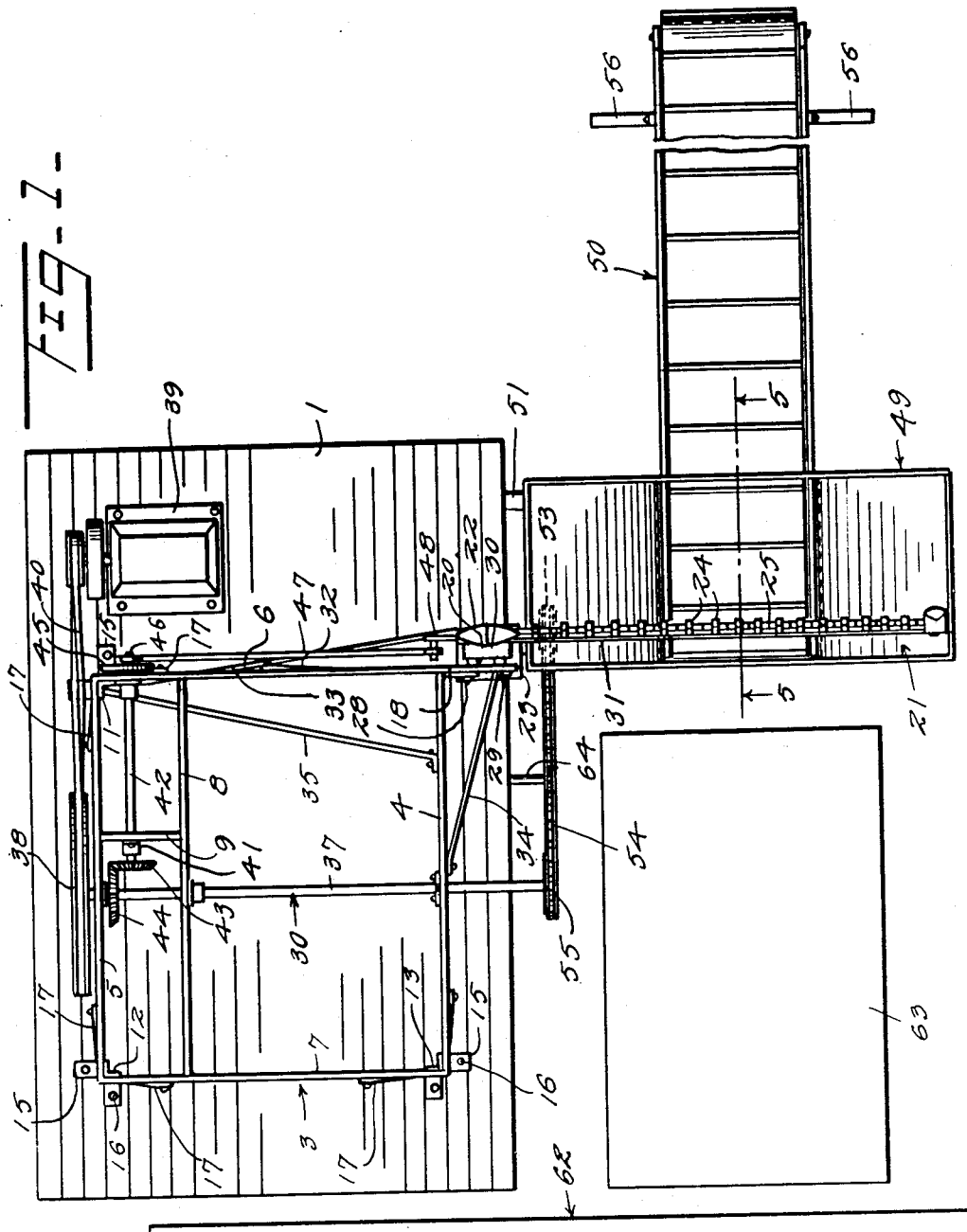

1,949,779

UNITED STATES PATENT OFFICE 1,949,779

HEADING MACHINE FOR KAFFIR-CORN, SORGHUM, AND THE LIKE

Paul Bushkovski, White Water, Kans.

Application November 19, 1931, Serial No. 576,174

1 Claim. (Cl. 146—81)

This invention relates to a machine for heading sheaves of kaffir-corn or sorghum, and has for one of its objects to provide a novel, simple and inexpensive machine of this character through the medium of which one man may head in a given time, with comparatively little effort, more sheaves of kaffir-corn or sorghum than it is possible for two men to head with the machines now in use.

The invention has for a further object to provide a machine of the character stated which will be readily portable so that the sheaves may be headed in the field or at any other suitable place.

The invention has for a further object to provide a machine of the character stated which will include a cutting mechanism extending laterally therefrom so that a hay rack or other suitable vehicle, containing the sheaves and having one side thereof removed, may be drawn up into spaced parallel position with relation to the cutting mechanism with its open side facing the cutting mechanism, to the end that the operator may occupy a position between the vehicle and cutting mechanism and thus enable him to conveniently remove the sheaves from the vehicle, head them and then return the headed sheaves to the vehicle to be hauled to a place of storage.

The invention has for a further object to provide a machine of the character stated wherein the cutting mechanism will include upwardly and forwardly inclined fixed and movable knives, and means for operating the movable knives, the upwardly and forwardly inclined position of the knives permitting the sheaves to be headed by swinging them downwardly and rearwardly with relation to the knives.

The invention has for a further object to provide a machine of the character stated which will include means adapted to receive the heads from the cutting mechanism and stack them at a distance from the machine.

With the foregoing and other objects in view, the nature of which will appear as the description proceeds, the invention consists in the construction, combination and arrangement of parts hereinafter fully described and claimed, and illustrated in the accompanying drawings, wherein:—

Figure 1 is a top plan view of the heading machine with the hay rack in unloading position with relation thereto;

Figure 2 is a view in side elevation on an enlarged scale of the heading machine;

Figure 3 is a detail sectional view taken on the plane indicated by the line 3—3 of Figure 2;

Figure 4 is a detail sectional view taken on the plane indicated by the line 4—4 of Figure 2;

Figure 5 is a detail sectional view taken on the plane indicated by the line 5—5 of Figure 1;

Figure 6 is a detail sectional view taken on the plane indicated by the line 6—6 of Figure 3;

Figure 7 is a similar view taken on the plane indicated by the line 7—7 of Figure 6, and Figure 8 is a view partly in front elevation and partly in longitudinal section of the means for supporting the rear end of the elevating conveyor forming a part of the machine.

The heading machine comprises a platform 1 which may be mounted upon the running gear 2 of a farm wagon or other suitable vehicle. A frame 3 comprising right and left hand longitudinal bars 4 and 5, respectively, front and rear transverse bars 6 and 7, respectively, a longitudinal bar 8 arranged in close relation to the bar 5, and a transverse bar 9 secured to and extending between the bars 5 and 8, is mounted in a downwardly and forwardly inclined position upon the platform 1. The frame 3 is supported above the platform 1 by legs 10, 11, 12 and 13. The legs 10 and 11 are shorter than the legs 12 and 13 to support the frame 3 in its downwardly and forwardly inclined position. The legs 11—13 are similar as to construction, and are secured to the frame 3, as at 14, and are provided at their lower ends with feet 15 through the medium of which they are secured by bolts 16 to the platform 1. Braces 17 secured to the frame 3 and to the legs 11—13, hold the frame and legs against any relative movement.

The frame 3 is provided at its right hand front corner with an outwardly or laterally directed extension 18 to which are secured, as at 19, downwardly directed bars 20 which constitute the leg 10 and which rest upon and are secured to the inner end portion of the finger bar 21 forming part of the cutting mechanism. The cutting mechanism includes the usual reciprocating cutter or sickle bar 48 and the finger bar 21, which guides and supports the cutter bar. The finger bar 21 is formed at its inner end with an upwardly extending protective shoe 22 and with an inwardly projecting lug 23 disposed at right angles to the cutter bar. The finger bar is also provided with the usual upwardly extending fixed knives 24 and the cutter bar with the usual knives 25, a ledger plate 31 holding the cutter bar in place upon the finger bar.

The inwardly directed lug 23 at the rear end of the finger bar, is employed for the purpose of securing the cutting mechanism to the platform 1 in such position as to arrange its fixed knives 24 and its movable knives 25 in an upwardly and forwardly inclined position. A metal block 26 bolted to the platform 1, has a downwardly and forwardly inclined upper side upon which the lug 23 rests, and is provided with an upwardly directed pin 27 which passes through the lug, the block and pin supporting the cutting mechanism with its knives 24 and 25 in an upwardly and forwardly inclined position. The cutting mechanism is held in place upon the block 26 by the leg bars 20 which are secured by bolts 28 and 29 to the rear side of a hollow spacing block 30 which is secured by the bolts to the rear side of the inner end of the finger bar 21 below the upwardly extending shoe 22. A brace 32 extends from the frame bar 6 to the bolt 28, a brace 33 extending from the leg 11 to this bolt, and a brace 34 extends from the frame bar 4 to the bolt 29, and cooperates with the leg bars 20 and the pin 27 to positively hold the inner end of the finger bar 21 carried thereby, against any movement with relation to the platform 1. The brace 32 is connected to the bolt 28 rearwardly of the shoe 22, and the brace 33 is connected to this bolt forwardly of the shoe. The leg 11 is further braced by a bar 35 extending thereto from the frame bar 4.

Transversely alined bearing brackets 36 extend downwardly from the frame bars 4 and 5, and journaled therein is a shaft 37 which is provided at one end with a belt wheel 38 and which has the other end thereof extended laterally beyond the right hand edge of the platform 1.

An internal combustion engine 39 of any well-known or appropriate construction is secured upon the platform 1 forwardly of the frame 3, and has the power shaft thereof connected by a bolt 40 to the wheel 38.

Longitudinally alined bearing brackets 41 extend downwardly from the frame bars 6 and 9, and journaled therein is a shaft 42 which has fixed to its rear end a beveled pinion 43 meshing with a beveled gear 44 fixed to the shaft 37. The shaft 42 is provided at its front end with a disk 45, and carried by the disk is a wrist pin 46 which is connected by a pitman 47 to the cutter bar 48 of the cutting mechanism. If desired the legs 10, 11, 12 and 13 may be of such height as to support the frame 3 far enough above the platform 1 to obviate the necessity of providing the platform with an opening for the reception of the lower portion of the belt wheel 38, or if desired the legs may be made adjustable to support the frame at the required height.

A hopper 49 is located below the cutting mechanism for the reception of the kaffir-corn or sorghum heads as they are cut from the sheaves. An elevating conveyor 50 of any well-known or appropriate construction, extends upwardly and forwardly from the hopper 49, and serves to carry the heads from the hopper and stack them at a point remote from the cutting mechanism. The hopper 49 is connected to the platform 1 by brackets 51. The rear shaft 52 of the conveyor 50 has fixed thereto a sprocket wheel 53. A sprocket chain 54 passes about the sprocket wheel 53 and about a sprocket wheel 55 fixed to the shaft 37. The front end of the conveyor 50 is supported from the ground by props 56, and the rear end of the conveyor is supported from the ground by props 57 which rest upon a base bar 58 of V-form in cross section. The props 57 are secured to the base bar 58 by a rod 59 secured to and extending between the props and by hooks 60 engaged with the rod and with the base bar. The base bar 58 is anchored to the ground by stakes 61.

In practice, the heading machine is drawn to the field or other suitable place, a hay rack with one side thereof removed and containing the sheaves is drawn up to the heading machine in parallel relation to the cutting mechanism with the open side of the hay rack facing the cutting mechanism, and a platform is erected between the hay rack and cutting mechanism, as shown in Figure 1, wherein 62 designates the hay rack and 63 the platform.

The cutting mechanism is higher than the bottom of the hay rack 62 and the platform 63, and the bottom of the hay rack and platform are in the same horizontal plane. The engine 39 is now started to effect the operation of the shafts 37 and 42, the shaft 37 operating the conveyor through the sprocket chain 54 and the shaft 52, and the shaft 42 operating the knives 25 of the cutting mechanism through the wrist pin 46 and the pitman 47. With the cutting mechanism and the conveyor 50 in operation, the operator stands on the platform 63 and lifts the sheaves from the hay rack 62 and presents their heads to the cutting mechanism. By swinging the sheaves downwardly and rearwardly with relation to the cutting mechanism, the heads will be severed. The severed heads fall into the hopper 49, and are carried from the hopper and stacked by the elevating conveyor 50. After each sheave has been headed it is placed in the hay rack 62, and after all of the sheaves have been headed the hay rack is moved to the place where the sheaves are to be stored. The hay rack is not fully loaded in order that the headed sheaves may be readily removed therefrom and returned thereto after being headed. As the knives 25 occupy an upwardly and forwardly inclined position and are higher than the hay rack 62 and platform 63, and as the operator is stationed between the cutting mechanism and the hay rack, he may with comparatively little effort head in a given time a comparatively large number of sheaves and any suitable tensioning means, such as shown at 64, may be provided for the sprocket chain 54.

While I have described the principle of the invention, together with the structure which I now consider the preferred embodiment thereof, it is to be understood that the structure shown is merely illustrative and that such changes may be made, when desired, as fall within the scope of the invention as claimed.

What is claimed is:

A heading mechanism for kaffir corn including a wheel supported platform, a cutting mechanism including a finger bar having at its inner end a lug extending at right angles to the plane of the finger bar, the finger bar carrying fixed knives, a block having a downwardly and forwardly inclined upper surface disposed between the lug and the platform and attached to the platform, the block having an upwardly extending pin and the lug having an aperture through which the pin passes, a supporting frame mounted upon the platform and having downwardly extending legs, the lower ends of the legs being operatively connected to the finger bar above said lug and block to hold the finger bar rigidly in place upon the block, the inner end of the finger bar opposite said lug being formed with an upwardly projecting protective shoe, a knife bar mounted for reciprocation on the finger bar and having upwardly extending knives coacting with the fixed knives of the finger bar, the block supporting the finger bar with its knives and the knives of the cutter bar extending upward and outward, a motor mounted on the platform, means on the frame for reciprocating the cutter bar and driven by said motor, a hopper supported by the platform and disposed beneath the cutting mechanism, and an elevator operating in said hopper and extending upward and outward therefrom, and means operated by the motor and carried upon the frame for driving said elevator.

PAUL BUSHKOVSKI.